US009777689B2

(12) United States Patent
Schuele (10) Patent No.: US 9,777,689 B2
(45) Date of Patent: Oct. 3, 2017

(54) VALVE FOR INJECTING GAS (71) Applicant: Continental Automotive GmbH, Hannover (DE)

(72) Inventor: Harry Schuele, Neunburg V. Wald (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 14 days.

(21) Appl. No.: 14/780,784

(22) PCT Filed: Mar. 4, 2014

(86) PCT No.: PCT/EP2014/054153
§ 371 (c)(1),
(2) Date: Sep. 28, 2015

(87) PCT Pub. No.: WO2014/154451
PCT Pub. Date: Oct. 2, 2014

(65) Prior Publication Data
US 2016/0053734 A1 Feb. 25, 2016

(30) Foreign Application Priority Data
Mar. 28, 2013 (DE) .......................... 10 2013 205 624

(51) Int. Cl.
*F02M 63/00* (2006.01)
*F02M 21/02* (2006.01)
*F02M 55/02* (2006.01)

(52) U.S. Cl.
CPC .... *F02M 63/0017* (2013.01); *F02M 21/0254* (2013.01); *F02M 21/0269* (2013.01);
(Continued)

(58) Field of Classification Search
CPC ............... F02M 21/02; F02M 21/0254; F02M 21/0269; F02M 21/0275; F02M 55/025;
(Continued)

(56) References Cited

U.S. PATENT DOCUMENTS 4,069,800 A * 1/1978 Kanda .................. F02M 57/025
123/447
4,170,974 A * 10/1979 Kopse .................... F02M 47/00
123/445
(Continued)

FOREIGN PATENT DOCUMENTS

BE 889978 A1 12/1981 ............. F02B 75/02
DE 19524413 A1 1/1997 ............... F02D 9/12
(Continued)

OTHER PUBLICATIONS

German Office Action, Application No. 102013205624.9, 7 pages, Nov. 26, 2013.
(Continued)

*Primary Examiner* — John Kwon
*Assistant Examiner* — Johnny H Hoang
(74) *Attorney, Agent, or Firm* — Slayden Grubert Beard PLLC (57) ABSTRACT

A valve for injecting fuel in an internal combustion engine includes a housing having an inflow section and an outflow section for the fuel and a drive section situated between the inflow section and the outflow section. A first control element is provided which is assigned to the inflow section and which enables or prevents the supply of the fuel in a manner dependent on a switching position of the first control element. A second control element is provided which is assigned to the outflow section and which enables or prevents the discharge of the fuel in a manner dependent on a switching position of the second control element. An actu-
(Continued)

ating drive is provided which is arranged in the drive section and which is coupled to both control elements such that the control elements can be moved into an open position independently of one another.

16 Claims, 3 Drawing Sheets

(52) U.S. Cl.
CPC ...... *F02M 55/025* (2013.01); *F02M 63/0059* (2013.01); *F02M 21/0275* (2013.01); *Y02T 10/32* (2013.01)

(58) Field of Classification Search
CPC . F02M 63/0017; F02M 63/0059; Y02T 10/32
USPC ....... 123/445, 446, 478, 480, 490, 499, 506; 239/533.1, 533.2
See application file for complete search history.

(56) References Cited

U.S. PATENT DOCUMENTS

| | | | | |
|---|---|---|---|---|
| 4,333,436 | A * | 6/1982 | Kopse | F02M 57/025 123/467 |
| 5,682,858 | A * | 11/1997 | Chen | F02M 45/04 123/467 |
| 5,996,558 | A * | 12/1999 | Ouellette | F02D 19/10 123/27 GE |
| 6,422,488 | B1 | 7/2002 | Fochtman et al. | 239/585.5 |
| 6,463,914 | B2 * | 10/2002 | Augustin | F02M 59/105 123/467 |
| 7,506,635 | B2 * | 3/2009 | Omae | F02M 63/0015 123/467 |
| 7,931,211 | B2 | 4/2011 | Yamamoto et al. | 239/88 |
| 8,978,623 | B2 * | 3/2015 | Sommars | F02M 43/04 123/456 |
| 9,133,808 | B2 * | 9/2015 | Fiveland | F02M 69/04 |
| 2005/0263621 | A1 * | 12/2005 | Brenk | F02M 45/02 239/533.2 |
| 2006/0186226 | A1 * | 8/2006 | Boecking | F02M 45/083 239/533.2 |
| 2009/0321668 | A1 * | 12/2009 | Venkataraghavan | F02M 47/027 251/129.01 |
| 2015/0041568 | A1 * | 2/2015 | Izzo | F02M 51/0685 239/585.5 |

FOREIGN PATENT DOCUMENTS

| | | | | |
|---|---|---|---|---|
| DE | 102008000511 A1 | 9/2008 | ............ | F02M 51/06 |
| DE | 102009012688 B3 | 7/2010 | ................ | F16K 31/06 |
| DE | 102009012689 B4 | 4/2011 | ................ | F01L 5/04 |
| EP | 1491753 A1 | 12/2004 | ............ | F02B 23/10 |
| JP | 0783146 A | 3/1995 | ............ | F02M 51/06 |
| JP | 10030517 A | 2/1998 | ............ | F02M 21/02 |
| JP | 11062710 A | 3/1999 | ............ | F02M 21/02 |
| JP | 2002115604 A | 4/2002 | ............ | F02M 21/02 |
| JP | 2009180137 A | 8/2009 | ............ | F02M 21/02 |
| WO | 98/51925 A1 | 11/1998 | ............ | F02D 19/10 |
| WO | 2014/154451 A1 | 10/2014 | ............ | F02M 21/02 |

OTHER PUBLICATIONS

International Search Report and Written Opinion, Application No. PCT/EP2014/054153, 21 pages, May 26, 2014.

* cited by examiner

VALVE FOR INJECTING GAS

CROSS-REFERENCE TO RELATED APPLICATIONS

This application is a U.S. National Stage Application of International Application No. PCT/EP2014/054153 filed Mar. 4, 2014, which designates the United States of America, and claims priority to DE Application No. 10 2013 205 624.9 filed Mar. 28, 2013, the contents of which are hereby incorporated by reference in their entirety.

TECHNICAL FIELD

The invention relates to a valve for injecting gas into the combustion chamber of an internal combustion engine.

BACKGROUND

Besides the known liquid fuels, such as petrol or diesel, gaseous fuels, in particular compressed natural gas (CNG), are being used increasingly in modern internal combustion engines for economic and environmental reasons. Since the natural gas filling station infrastructure is still not extensive, both liquid and gaseous fuels are often used for alternative operation of the internal combustion engine with both fuels. The term used here is bivalent operation of the internal combustion engine, as opposed to monovalent operation with just one single type of fuel.

The gas supply system of such an internal combustion engine usually comprises a gas reservoir, shut-off valves, temperature and pressure sensors, a pressure reducer or pressure regulator, a number of gas injection valves corresponding to the number of cylinders of the internal combustion engine, and corresponding fluid lines, together with an electronic control device.

The natural gas is usually stored in one or more cylinders at pressures of up to 200 bar. A pressure reducer or an electrical pressure regulator reduces this pressure to a lower value at the inlet to the gas injection valves. If the gas is injected into the inlet manifold of the internal combustion engine (port injection), typical pressure values lie in the range of 2-8 bar, depending on the characteristics of the injection valves.

In view of the advantages afforded by direct injection of the fuel into the combustion chamber of the internal combustion engine, such as lower emissions and reduced fuel consumption, systems are known which allow the natural gas to be injected directly into the combustion chambers of the internal combustion engine. In order to achieve this, however, the pressure of the natural gas on a rail or at the gas injection valve must be greater than in the case of inlet manifold injection of the natural gas. Typical values in this case lie in the range of 5-20 bar, in order to be able to introduce the necessary quantity of gas in a shorter available time span compared to inlet manifold injection.

The gas injection valves are usually embodied as so-called solenoid valves, in which a solenoid coil is provided as actuator and a nozzle needle as control element, these parts delivering the gas into a combustion chamber of the internal combustion engine or preventing the flow of gas depending on their electrical activation.

In the case of a gas injection valve the limits to the possible fuel flow rate are encountered very rapidly since, owing to the lower energy density of the gas compared to liquid fuels, for the same valve opening period a larger port cross section is needed than in the case of a liquid injection valve, in order to attain a specific power output of the internal combustion engine. The required port cross section can be achieved by an increased nozzle needle lift or a larger disk. A larger diameter of the valve disk has the disadvantage, however, that this increases the gas forces acting on the valve disk.

The increased lift means that the greater the distance between the solenoid coil and the control element that can be actuated thereby, the smaller the magnetic forces capable of raising the control element become. This means that the flow rate can exceed a specific amount for a preset electrical supply voltage and a preset supply current, and a given gas pressure.

For direct injection of the gas into the combustion chamber of an internal combustion engine, therefore, use is made of gas injection valves which have a valve needle opening outwards, that is to say into the combustion chamber. Besides a reduced flow resistance for the gas to be introduced, this has the further advantage that in addition to the force of the return spring the gas forces in the combustion chamber of the internal combustion engine also keep the valve port closed during combustion.

The problem with such gas injection valves is that the seat of the valve needle is exposed to the high combustion temperatures in the combustion chamber of the cylinder, therefore ruling out efficient sealing materials such as plastic or rubber as materials for the seat. It is thereby difficult to fulfill the prescribed leak-tightness requirements for components of CNG installations according to the ECE R 110 regulations. In addition, the high sealing forces necessary mean that the seat is subject to increased wear on closing of the valve. In order to minimize the wear, expensive paired material combinations are used for the seat and the valve disk. Such high-strength paired material combinations moreover tend to cause the valve needle to rebound.

DE 10 2009 012 688 B3 describes a valve for injecting gas which can be actuated by small magnetic forces. For this purpose a control element and a closing element are provided, the control element when in the closed position being situated at a short distance from the solenoid coil. The control element is operatively connected to the closing element in such a way that when an electrical current is passed through the solenoid coil the control element carries the closing element towards the solenoid coil. Furthermore, the closing element is attracted even closer to the solenoid coil and as far as an open position by magnetic forces of the solenoid coil, regardless of the movement of the control element. By providing the control element and the closing element it is possible to open an outlet port of the valve through a first movement of the control element and a linked movement of the closing element. This is accompanied by a fall in pressure in a delivery chamber, in which the control element and the closing element are situated. The gas pressure and the associated forces acting on the closing element are thereby reduced. A further movement of the closing element into an open position, in which the outlet port is fully opened, can therefore be achieved by small magnetic forces.

DE 10 2009 012 689 B4 discloses a valve for delivering gas into a combustion chamber of an internal combustion engine, the valve having a housing and an output chamber being provided in the housing. The delivery chamber has an outlet port, an actuator, in particular a solenoid valve having a coil and a magnetic closing element, being arranged in the housing. The closing element is assigned to the outlet port, the closing element opening or closing the outlet port depending on the actuation of the actuator. The closing element is guided in a guide of the housing, the closing element being guided through the delivery chamber to the outlet port and the closing element in a closed position in the delivery chamber being subjected to gas pressure only transversely to the moving direction of the closing element. The closing element can thereby be moved from the closed position into the open position with only slight counter-pressure, so that a less powerful actuator can be used for actuating the closing element.

SUMMARY

One embodiment provides a valve for injecting gaseous fuels for an internal combustion engine, the valve comprising: a housing which in its longitudinal extent comprises an inflow portion and an outflow portion for the gaseous fuel, and a drive portion situated between the inflow portion and the outflow portion; a first control element which is assigned to the inflow portion and which either enables or prevents the delivery of the gaseous fuel depending on a switching position of the first control element; a second control element which is assigned to the outflow portion and which either enables or prevents the delivery of the gaseous fuel depending on a switching position of the second control element; and having an actuating drive which is arranged in the drive portion and is coupled to both control elements in such a way that the control elements can be brought into an open position independently of one another.

In a further embodiment, the actuating drive is embodied in the form of a solenoid coil, which is arranged in a chamber of the drive portion and has a central opening.

In a further embodiment, the first control element comprises a cylindrical body on whose free end facing the solenoid coil there is formed an armature plate composed of ferromagnetic material, which armature plate, in a closed position of the first control element, assumes a distance from the end face of the solenoid coil.

In a further embodiment, on its end face facing an inlet port of the inflow portion the first control element comprises a closing member, which in a closed position of the first control element is pressed against the seat by means of a first spring element.

In a further embodiment, a fuel duct, which runs from an inflow chamber present in the inflow portion in the direction of the armature plate and passes centrally though the latter.

In a further embodiment, a chamber is provided in the armature plate.

In a further embodiment, the second control element comprises a cylindrical body, wherein a portion of the cylindrical body is guided through the central opening of the solenoid coil, and a flange, which partially projects into the chamber of the armature plate is formed on the end of the cylindrical body projecting from the opening, so that in a closed position of the second control element a distance remains between an end face of the flange and the base of the chamber.

In a further embodiment, the second control element, at its end facing a delivery chamber inside the outflow portion, is formed with a second closing member in the form of a valve disk which, in a closed position of the second control element, is pressed against a seat by means of a second spring element.

In a further embodiment, an axially running fuel duct, which extends from the end face of the flange into the proximity of the closing member and there communicates with a radially running bore leading to the outside of the cylindrical body is provided in the cylindrical body, so that a flow connection to the delivery chamber is established.

In a further embodiment, a flow connection exists between the fuel duct running in the cylindrical body of the first control element and the fuel duct running in the cylindrical body of the second control element.

In a further embodiment, the cylindrical body of the second control element is guided in an axial movement by means of at least one guide web arranged on the inside wall of the outflow portion.

In a further embodiment, the cylindrical body of the second control element comprises a circumferential flange, which is supported on the inside wall of the outflow portion so that the second control element is guided in an axial movement.

In a further embodiment, the sealing face of the inflow portion and at least the sealing face of the closing member of the first control element contain elastomer material.

In a further embodiment, the spring characteristic of the first spring element in the inflow portion is greater than the spring characteristic of the second spring element in the outflow portion.

In a further embodiment, the flange is composed of ferromagnetic material.

BRIEF DESCRIPTION OF THE DRAWINGS

Example embodiments are discussed below with reference to the drawings, in which.

DETAILED DESCRIPTION

Embodiments of the invention provide an improved valve for directly injecting gaseous fuels into the combustion chamber of an internal combustion engine.

Embodiments of the invention provide a valve for injecting gaseous fuels for an internal combustion engine, wherein the housing in its longitudinal extent comprises an inflow portion and an outflow portion for the gaseous fuel, and a drive portion situated between the inflow portion and the outflow portion. A first control element is assigned to the inflow portion and either enables or prevents the delivery of the gaseous fuel depending on a switching position of the first control element. A second control element, which is assigned to the outflow portion, either enables or prevents the delivery of the gaseous fuel, depending on a switching position of the second control element. An actuating drive is provided, which is arranged in the drive portion and is coupled to the two control elements in such a way that the control elements can be brought into an open position independently of one another.

According to one embodiment one solenoid coil serves as actuating drive for both control elements, thereby affording a very simple, robust and cost-effective construction of the gas injection valve.

By using a single actuating drive to actuate two control elements actuated independently of one another, the first of which by means of a closing member provides a tight seal against the pressurized gas present on the inflow portion, and the other of which by means of a further closing member on the outflow portion creates a tight seal in relation to the combustion chamber of the internal combustion engine, it is possible to use different materials for the closing members and/or seats of the two closing members.

Since the seat on the inflow portion is not exposed to high temperatures like those which prevail at the seat on the outflow portion, the closing member of the first control element on the inflow portion and/or the sealing faces thereof can advantageously be produced from efficiently sealing, flexible but at the same time cost-effective materials such as elastomers, plastics or rubber parts. It is thereby possible, by simple means, to meet the statutory leak-tightness requirements for components of a gas supply system for an internal combustion.

According to one embodiment the first control element is biased by means of a first spring element, so that in a closed position of the first control element its closing member is pressed against the seat. The spring characteristic selected for the first spring element depends on the prevailing pressure of the gas, which is usually delivered from a rail. This is a simple way of achieving a tight seal at the so-called "cold end" of the gas injection valve.

According to a further embodiment the second control element is biased by means of a second spring element, so that in a closed position of the second control element its closing member is pressed against the seat on the outflow portion. Since this closing member does not have to withstand the high pressure of the gaseous fuel whilst the gas injection valve is in the closed position, but merely has to create a tight seal in relation to the combustion chamber of the internal combustion engine, a spring element with a smaller spring characteristic can be used here.

Since the second control element is designed as an outwardly opening valve needle, the gas pressure in the combustion chamber exerts an additional sealing force counter to the opening direction of the closing member during periods when the gaseous fuel is not being injected. Materials which do not fulfill more stringent leak-tightness requirements can therefore be used for the closing element and its sealing faces arranged at the so-called "hot end" of the gas injection valve, which contributes to a cost-effective embodiment of the gas injection valve.

The at least partial decoupling of the movement of the two control elements also means that smaller forces are required in order to actuate the opening sequence of the gas injection valve. Initially, when the actuating drive is activated only the first control element on the inflow portion is lifted from its seat and thereby partially opened. Since at this time the second control element is still not yet being moved, a small force is sufficient for this purpose. It is only necessary to overcome the counterforce of the first spring element.

Only when the first control element has partially opened an inlet port for the gaseous fuel is the second control element also moved in the opening direction by means of the actuating drive, the movement being additionally assisted by the pressurized gas flowing into the gas injection valve, so that the gas injection valve opens at precisely the correct time, which among other things leads to an accurate addition of the fuel into the combustion chamber of the internal combustion engine.

Figure 1:
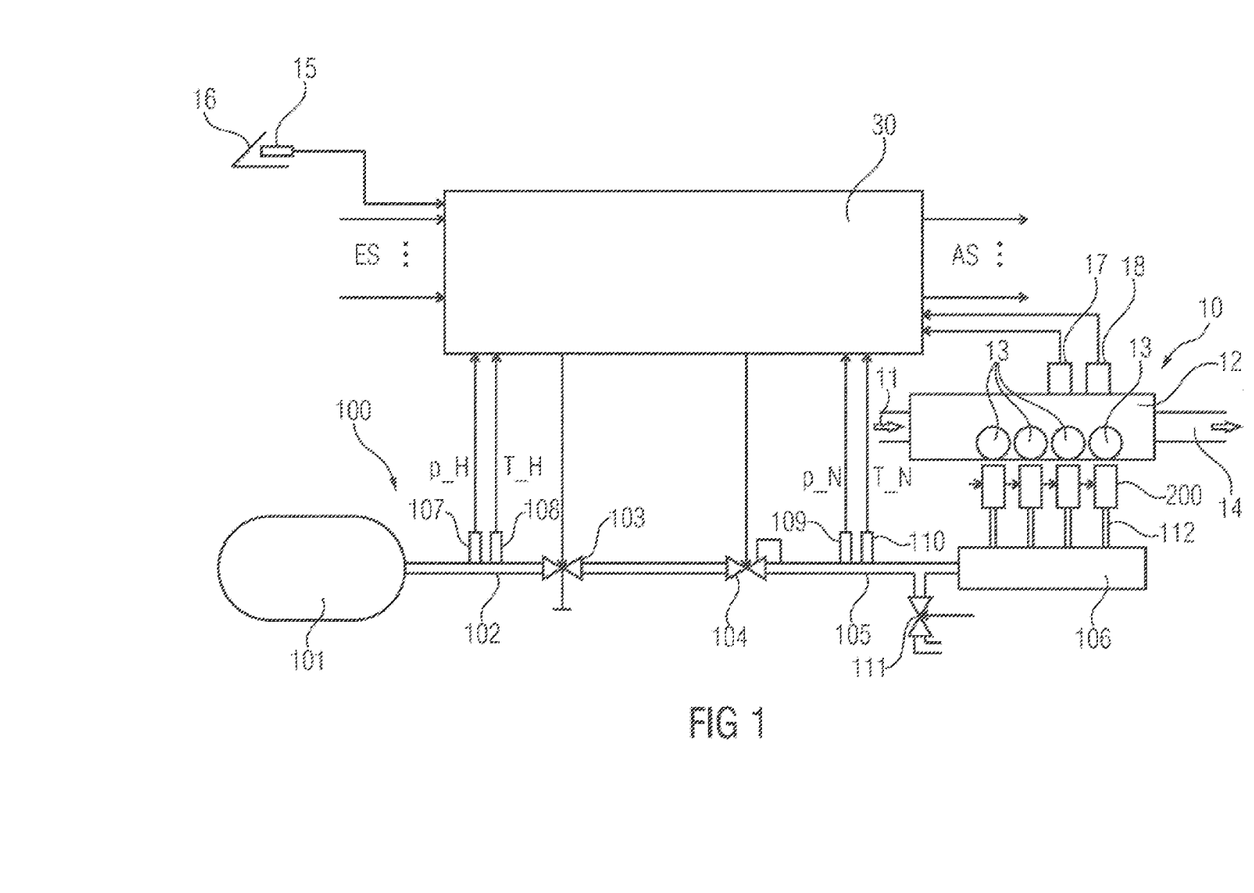
FIG. 1 shows a block diagram of an internal combustion engine with a gas supply system.

FIG. 1 shows a diagrammatic representation of an internal combustion engine 10 with internal mixture-formation, which is operated using natural gas a fuel. It comprises, among other things, an intake tract 11, an engine block 12 with cylinders 13 and an exhaust tract 14. The fresh air needed for combustion of the gas/air mixture is fed to the internal combustion engine 10 via the intake tract 11. The combustion exhaust gases flow through at least one exhaust catalytic converter, arranged in the exhaust tract 14, and a silencer into the surroundings.

A gas supply system 100 of known construction is provided for operation of the internal combustion engine 10 with fuel.

The natural gas is stored in a gas reservoir 101, generally embodied as a high pressure-resistant tank in the form of one or more cylinder fittings, at a predefined pressure, for example at a pressure of 200 bar.

Via a high-pressure line 102 the gaseous fuel can be delivered via a shut-off valve 103, a pressure reducer or pressure regulator 104 to a low-pressure line 105.

The release of gas from the gas reservoir 101 can be cut-off by the shut-off valve 103, as is necessary, for example, when switching off the internal combustion engine 10 or when switching over to another type of fuel in the case of bivalent internal combustion engines. The pressure reducer or pressure regulator 104 serves for reducing the gas pressure to the values necessary for the low-pressure line 105, for example 5-20 bar. DE 195 24 413 A1 discloses such a pressure regulating unit of a fuel preparation system for gaseous fuels. This pressure-regulating unit comprises a solenoid valve, which is activated by clock pulses from an electronic control unit and which serves for setting an exact pressure level and a precise flow rate on the low-pressure side.

The low-pressure line 105 is connected to a fuel rail 106 serving as fuel reservoir. Branching off from the fuel rail 106 are a number of feed lines 112, corresponding to the number of cylinders 13, at the free ends of each of which a gas injection valve 200 is provided, in such a way that on appropriate electrical activation of the gas injection valves 200 gas can be injected directly into the respective combustion chambers of the internal combustion engine 10.

The gas supply system 100 of the internal combustion engine 10 further comprises a temperature sensor 107 and a pressure sensor 108 for registering the temperature T_H and the pressure p_H respectively of the gas on the high-pressure side, a temperature sensor 109 and a pressure sensor 110 on the low-pressure side for registering the temperature T_N and the pressure p_N respectively of the gas on the low-pressure side, and a pressure relief valve 111, which is arranged on the low-pressure line 105 in proximity to the fuel rail 106.

Furthermore a control device 30 is provided, to which sensors are assigned, which register various measured variables and determine the measured value of the measured variable in each case. As a function of at least one of the measured variables, the control device 30 determines control variables which are then converted into one or more control signals for controlling the control elements by means of corresponding actuating drives.

The sensors include a pedal position sensor 15, which registers the position of an accelerator pedal 16, a load sensor 17 (for example a mass air flow sensor or intake manifold pressure sensor), which registers a signal representing the load of the internal combustion engine 10, a crankshaft angle sensor 18, which registers a crankshaft angle, to which a speed of the internal combustion engine 10 is then assigned, and the temperature sensors 107, 109 together with the pressure sensors 108, 110 on the high-pressure and low-pressure side of the gas supply system 100. Depending on the embodiment of the invention, any lesser number of said sensors or also additional sensors may be present, the signals from which are indicated generally by the reference character ES in FIG. 1.

The control elements are, for example, a throttle valve present in the intake tract 11, spark plugs serving to fire the gas/air mixture, the gas injection valves 200, the shut-off valve 103, the pressure regulator or pressure reducer 104 and the pressure relief valve 111. Further signals for further control elements, which are necessary for operation of the internal combustion engine 10 but not explicitly represented are identified generally in FIG. 1 by the reference character AS.

The control device 30 corresponds to a device for controlling the gas-powered internal combustion engine 10 and may also be referred to as an engine control unit. In particular, the set values for the pressure in the gas supply system 100 are determined as a function of the operating states of the internal combustion engine 10, and the signals of the pressure sensors 108, 110 and temperature sensors 107, 109 are evaluated for regulating the pressure in the gas supply system 100 and control signals are generated for the shut-off valve 103, the pressure reducer or pressure regulator 104 and the pressure relief valve 111. Alternatively, the pressure relief valve 111 may also be embodied as a purely mechanical pressure relief valve.

From data such as the engine speed, for example, the torque demand and/or the load of the internal combustion engine 10, the control device 30 furthermore calculates the required gaseous fuel injection quantity, the duration of injection and the start and/or end of injection. As a function of these and taking into account the gaseous state variables, in particular the temperature and pressure, activation signals are sent to the gas injection valves 200, so that the correct quantity of gas is fed to the combustion air.

The construction and the working principle of the injection valve 200 used in the gas supply system 100 according to FIG. 1 is now explained in more detail below.

Figure 2:
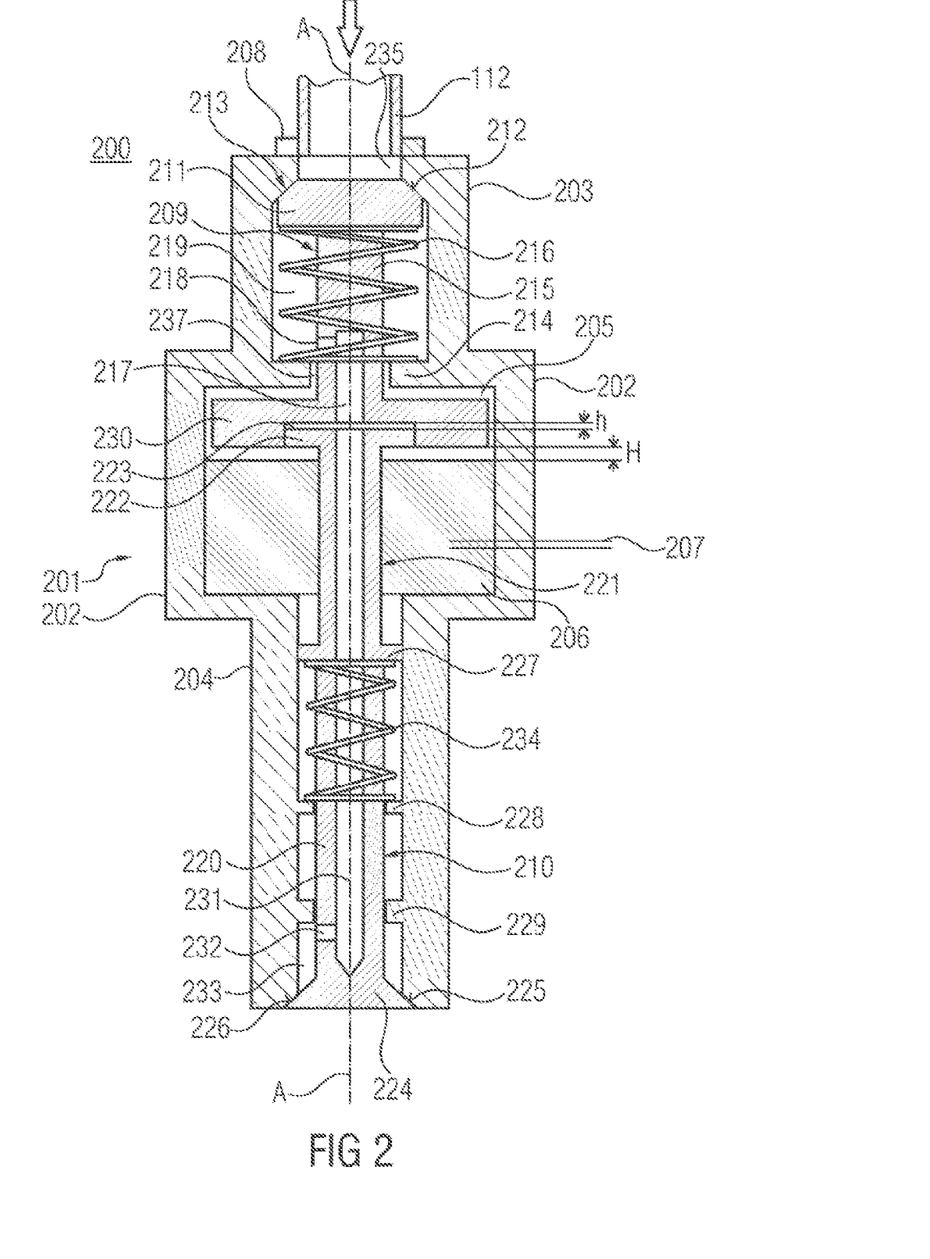
FIG. 2 shows a diagrammatic representation of a gas injection valve of the gas supply system in a closed position.

FIG. 2 shows a diagrammatic representation of the gas injection valve 200 in a closed position. It comprises a multipart housing 201, preferably composed of metal, so that the individual components situated in the housing 201 can be easily assembled.

After assembly of the components, still to be described in more detail, inside the housing 201 the latter is put together, for example by welding, so that it is fluid-tight. For reasons of clarity, the individual housing parts are not identified separately, but the representation shows the housing 201 in the assembled state as a single component.

The housing 201 is substantially of axially symmetrical design, its longitudinal axis being identified by the reference character A-A. The arrow symbol represents the direction of flow of the gaseous fuel, hereinafter referred to simply as gas. In its longitudinal axis A-A the housing 201 comprises a drive portion 202, an upstream inflow portion 203 for the gas adjoining the drive portion 202, and a downstream portion 204 for the gas adjoining the drive portion 202. The drive portion 202 has a greater width transversely to the longitudinal axis A-A, compared to the other two portions 203, 204. In this drive portion 202 a cylindrical chamber 205 is provided, into which a solenoid coil 20 serving as actuating drive for two control elements 209, 210 is inserted. The solenoid coil 206 is connected to the control device 30 by electrical lines represented only diagrammatically (FIG. 1).

The inflow portion 203 comprises a connection piece 208, to which the feed line 112 for the gas is connected, so that the gas can flow, as necessary, via a closeable inlet port 235 into the gas injection valve 200.

The first control element 209 is arranged inside the upstream inflow portion 203 and has a cylindrical body 215, which at the end facing the inlet port 235 comprises a mushroom-shaped closing member 211 wider than the cylindrical body 215, the sealing face 212 of which member interacts with a corresponding sealing face 213 on the inlet port 235 on the upstream inflow portion 203. At the opposite end of the cylindrical body 215 to the closing member 211 an armature plate 230 composed of ferromagnetic material is provided, which lies inside the chamber 205 and the radial extent of which substantially corresponds to the radial extent of the solenoid coil 206.

The drive portion 202 accommodating the solenoid coil 206 and the armature plate 230 is defined in the direction of the upstream inflow portion 203 by a flange 214 projecting radially inwards, so that a remaining passage 237 serves as axial guide for the cylindrical body 215 of the first control element 209. A first spring element 216 assigned to the cylindrical body 215, preferably a helical compression spring surrounding the body 215, is supported on the one hand on a side of the flange 214 remote from the armature plate 230 and on the other on the closing member 211, so that the spring force of the spring element 216 biases the first control element 209 and the closing member 211 is pressed with its sealing face 212 on to the sealing face 213 of the inflow portion 203.

The spring characteristic of the first spring element 216 is designed in such a way that in the closed position of the gas injection valve 200, that is to say in an unenergized state of the solenoid coil 206, the spring force is sufficient to counteract the pressure of the gas at the inlet port 235, so that no gas can get into the gas injection valve 200. The first control element 209 therefore serves to control the gas flow into the gas injection valve 200.

The spring force of the first spring element 216 at the same time acts to separate the armature plate 230 from the end face of the solenoid coil 206. The resulting distance, hereinafter referred to as the air gap, is identified by the reference character H.

The armature plate 230 comprises a fuel duct 217, which runs along the longitudinal axis A-A and which extends at least partially into the cylindrical body 215. At a point upstream of the flange 214 in the longitudinal axis A-A, in the inflow portion 203, a radial bore 218 runs from this fuel duct 217 to the outside of the cylindrical body 215, so that a flow connection is established between an inflow chamber 219, formed from the outside of the cylindrical body 215 and the inside wall of the inflow portion 203, and the fuel duct 217.

The second control element 210 likewise comprises a cylindrical body 220 and is arranged at least partially inside the downstream outflow portion 204. An upper portion of the cylindrical body 220 is guided through a central opening 221 of the solenoid coil 206 and has a flange 222 at its free end. The flange 222 may be composed of non-magnetic or ferromagnetic material.

A cylindrical chamber 223, the radial dimension of which corresponds to the radial dimension of the flange 222 and the axial depth of which is designed somewhat larger than the axial height of the flange 222, is provided in the armature plate 230, at its end face facing the solenoid coil 206, so that in the closed position of the gas injection valve 200 a distance, which hereinafter is also referred to as air gap h, remains between the base of the chamber 223 and the end face of the flange 222.

A closing member 224 in the form of a valve disk, the sealing faces 225 of which interact with corresponding sealing faces 226 on the downstream outflow portion 204, is formed at the opposite end of the cylindrical body 220 to the flange 222. The closing member 224 and the two sealing faces 225, 226 are exposed to the pressure in the combustion chamber of the internal combustion engine 10.

In addition to the guide for the cylindrical body 220 by means of the opening 221 in the solenoid coil 206, in an upper part of the outflow portion 204 the cylindrical body 220 has an outwardly projecting guide flange 227, which is supported on the inside wall of the outflow portion 204 and thus forms a guide face for the cylindrical body 220. In the lower part of the outflow portion 204 two radially circumferential guide webs 228, 229, spaced at a distance from one another, which come to bear on the external contour of the cylindrical body 220, project from the inside wall of the outflow portion 204, thereby also forming guide faces and affording further guided support during an axial movement of the second control element 220, and in particular preventing any tilting or jamming of the second control element 210.

The cylindrical body 220 of the second control element 210 has an axially running fuel duct 231, which also passes through the flange 222 and extends into the vicinity of the closing element 224 but does not pass through the latter.

Instead, at a point downstream of the guide web 229 in the longitudinal axis A-A, a radial bore 232 branches off to the outside of the cylindrical body 220, so that a flow connection is established between the fuel duct 231 and a delivery chamber 233, defined by the outside of the cylindrical body 220, the guide web 229 and the closing member 224. The fuel duct 231 of the cylindrical body 220 of the second control element 210 aligns with the fuel duct 217 of the cylindrical body 215 of the first control element 209, so that a flow connection for the gas is established between the first control element 209 and the second control element 210.

The second control element 220 is also biased by means of a second spring element 234, so that in the closed position of the gas injection valve 200, that is to say in the unenergized state of the solenoid coil 206, a seat is produced on the closing member 224. A helical compression spring, for example, which is supported on the one hand on the shoulder of the guide flange 227 formed on the body 220 remote from the solenoid coil 206, and on the other on the shoulder of the guide web 228 facing the solenoid coil 206, serves for this purpose. The selected spring characteristic of this second spring element 234, which biases the second control element 210 and thereby brings the sealing faces 225, 226 into contact, may be less than the spring characteristic of the first spring element 216 of the first control element 209, since this second control element is not exposed to the gas pressure whilst in the closed position. The second control element 210 serves to control the delivery of gas into the combustion chamber.

The working principle of the gas injection valve 20 described above is explained in more detail below.

If an electrical voltage is applied to the solenoid coil 206 by means of the electrical lines 207, the magnetic forces occurring will draw the armature plate 230 of the first control element 209 towards the solenoid coil 206 in opposition to the biasing force of the first spring element 216. The closing member 211 is lifted off slightly from the sealing face 213 of the inflow portion 203 by the axial movement of the first control element 209. Gas can thereby flow via the feed line 112 and the inlet port 235 into the inflow chamber 219 and from there by means of the radial bore 218 in the fuel duct 217 of the first control element 209 can pass onwards into the fuel duct 231 of the second control element 210.

Whilst the first control element 209 is already moving towards the solenoid coil 206, the second control element 210 still remains in its closed position. Only when the distance covered by the armature plate 230 is equal to the distance h (air gap) between the base of the chamber 205 and the end face of the flange 222 does the end face of the flange 222 come to bear against the base of the chamber 205, and the armature plate 230 then presses the second control element 210 downwards in opposition to the spring force of the second spring element 234, so that the closing member 224 beings to lift from its seat. At the same time the first control element 209 is opened further, until the armature plate 230 has completely overcome the distance H and comes to bear on the end face of the solenoid coil 206. The first closing member 211 and the second closing member 224 are therefore now situated in the open position. The gas flows out of the fuel duct 231 and via the radial bore 232 into the delivery chamber 233 and from there via an annular gap 236, defined by the closing member 224 lifted outwards, that is to say in the direction of the combustion chamber, and the sealing face 226 of the outflow portion 204, into the combustion chamber of the internal combustion engine 10.

Figure 3:
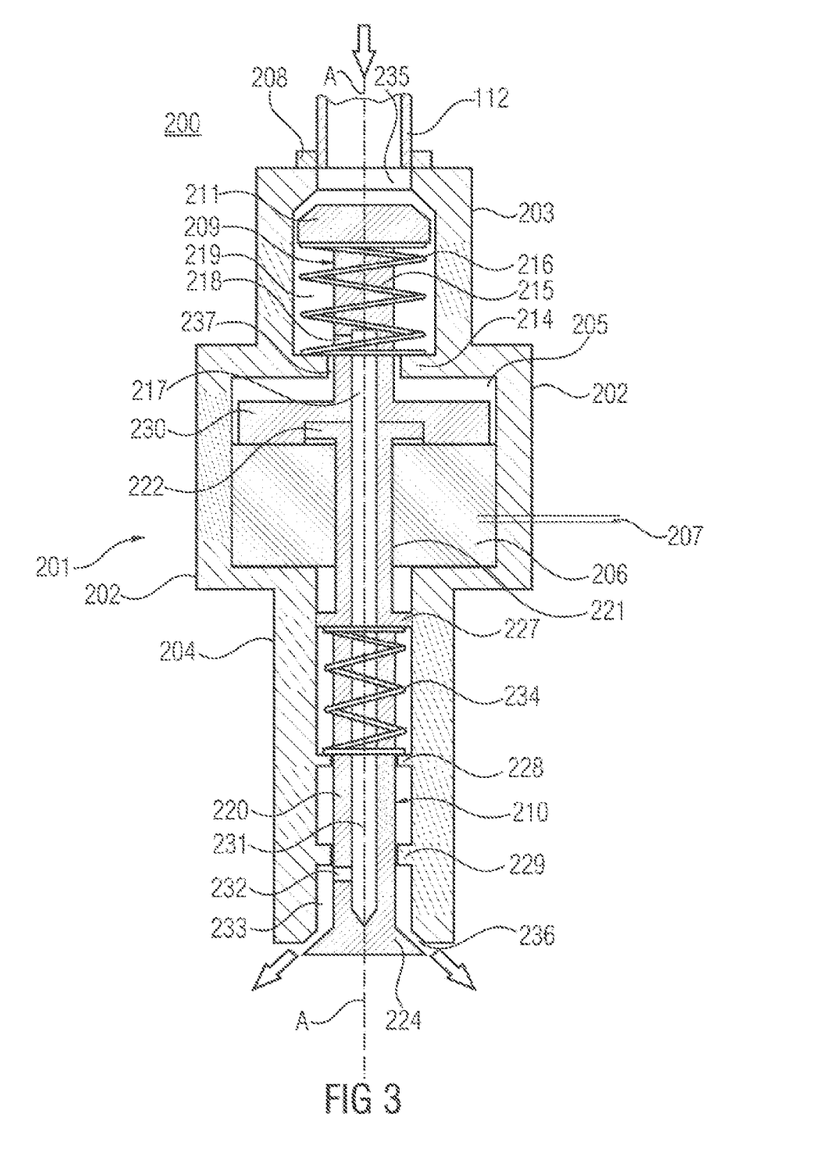
FIG. 3 shows a diagrammatic representation of a gas injection valve of the gas supply system in an open position

FIG. 3 shows the gas injection valve 200 in the open position, the arrow symbols identifying the gas flow direction.

In the open position a large effective flow cross section is opened in the outflow portion 204, resulting in a high gas flow rate. The embodiment described, having two separate control elements 209, 210 which at least in part are actuated independently of one another by means of a single solenoid coil 206, means that relatively high gas pressures can be overcome and high flow rates achieved with comparatively low electrical outputs for the solenoid coil 206.

If the energization of the solenoid coil 206 via the electrical lines 207 is now interrupted, the closing member 211 of the first control element 209 is brought with its sealing face 212 into bearing contact against the sealing face 213 of the inflow portion 203 by the force of the first spring element 216, and a further flow of gas into the gas injection valve 200 is reliably prevented. The second control element 210, moreover, is moved back into the initial position under the effect of the spring force of the spring element 234, as is shown in FIG. 2.

The air gap h between the base of the chamber 223 and the end face of the flange 222 also performs a play compensation function, since otherwise the closing member 224 might no longer form a seal on the outflow portion 204, because the flange 222 of the control element 210 is impinging on the base of the chamber 223.

The gas injection valve 200 has been explained in the context of an internal combustion engine which is designed purely for gas operation (monovalent operation). It can also be used, however, in internal combustion engines that are designed for bivalent operation, that is to say for the combustion of two different fuels such as petrol and gas, for example. In this case a conventional fuel supply system for petrol operation is also provided in addition to the fuel supply system described for the gaseous fuel.

The control device for such a dual-fuel operation of the internal combustion engine then undertakes the control and/or regulation of the injection of both types of fuel.

It is furthermore possible to use the gas supply system described having the gas injection valve 200 as a retrofitted solution on vehicles which are equipped, ex-works, for monovalent operation with another type of fuel, for example petrol. In this case the control device 30 for gas operation serves as additional engine control unit, which preferably communicates and exchanges data and signals with the engine control unit for petrol operation via an electronic data bus, for example a CAN bus.

LIST OF REFERENCE NUMERALS/TERMS 10 internal combustion engine
11 intake tract
12 engine block
13 cylinder
14 exhaust tract
15 pedal position sensor
16 accelerator pedal
17 load sensor
18 crankshaft angle sensor
30 control device
100 gas supply system
101 gas reservoir
102 high-pressure line
103 shut-off valve
104 pressure reducer, pressure regulator
105 low-pressure line
106 fuel rail
107 temperature sensor, high-pressure side
108 pressure sensor, high-pressure side
109 temperature sensor, low-pressure side
110 pressure sensor, low-pressure side
111 pressure relief valve
112 feed line
200 gas injection valve
201 housing of the gas injection valve
202 drive portion of the housing
203 inflow portion of the housing
204 outflow portion of the housing
205 chamber
206 actuating drive, solenoid coil
207 electrical line
208 connection piece
209 first control element
210 second control element
211 closing member of the first control element
212 sealing face of the closing member, first control element
213 sealing face of the inflow area
214 flange
215 cylindrical body, first control element
216 first spring element, helical compression spring
217 fuel duct
218 radial bore
219 inflow chamber
220 cylindrical body, second control element
221 central opening of the solenoid coil
222 flange of the second control element
223 chamber in the armature plate
224 closing member of the second control element, valve disk
225 sealing face of the closing member, second control element
226 sealing face of the outflow area
227 guide flange
228 guide web
229 guide web
230 armature plate
231 fuel duct
232 radial bore
233 delivery chamber
234 second spring element, helical compression spring
235 inlet port
236 annular gap on outflow area
237 passage
A-A longitudinal axis
AS output signals
ES input signals
h distance, air gap between flange and base of the chamber 223
H distance, air gap between solenoid coil and armature plate
T_H temperature of the gas on the high-pressure side
T_N temperature of the gas on the low-pressure side
P_H pressure of the gas on the high-pressure side
P_N pressure of the gas on the low-pressure side

What is claimed is:

1. A valve for injecting gaseous fuels for an internal combustion engine, the valve comprising:
a housing including an inflow portion and an outflow portion for the gaseous fuel, and a drive portion located between the inflow portion and the outflow portion,
a first control element assigned to the inflow portion and configured to enable or prevent the delivery of the gaseous fuel depending on a switching position of the first control element, the first control element comprising an armature plate with an end face facing an actuating drive;
a second control element assigned to the outflow portion and configured to enable or prevent the delivery of the gaseous fuel depending on a switching position of the second control element, the second control element comprising a flange at a first end of the second control element; and
the actuating drive arranged in the drive portion and configured to open the first and second control elements independently of one another;
wherein the flange of the second control element extends into a cylindrical chamber in the end face of the armature plate with an air gap between a base of the cylindrical chamber and an end face of the flange in a closed position of the valve.

2. The valve of claim 1, wherein the actuating drive comprises a solenoid coil arranged in a chamber of the drive portion and having a central opening.

3. The valve of claim 2, wherein the first control element comprises a cylindrical body having an armature plate comprising ferromagnetic material is formed on a free end of the cylindrical body facing the solenoid coil,
wherein the armature plate, in a closed position of the first control element, is spaced apart from the end face of the solenoid coil.

4. The valve of claim 3, comprising a first fuel duct that runs from an inflow chamber in the inflow portion, into the cylindrical body of the first control element, and through a center of the armature plate.

5. The valve of claim 2, wherein:
the second control element comprises a cylindrical body,
a portion of the cylindrical body is guided through the central opening of the solenoid coil, and
the flange projecting into the chamber of the armature plate is formed on an end of the cylindrical body projecting from the opening.

6. The valve of claim 5, comprising a second fuel duct in the cylindrical body of the second control element,
wherein the second fuel duct extends axially from the end face of the flange to a location proximate the closing member, and communicates with a radially running bore leading to an outside of the cylindrical body to define a flow connection to the delivery chamber.

7. The valve of claim 6, comprising a flow connection between the first fuel duct in the cylindrical body of the first control element and the second fuel duct in the cylindrical body of the second control element.

8. The valve of claim 5, wherein the flange comprises ferromagnetic material.

9. The valve of claim 1, wherein the first control element comprises a closing member which, in a closed position of the first control element, is pressed against the seat by a first spring element.

10. The valve of claim 9, wherein a sealing face of the inflow portion and a sealing face of the closing member of the first control element contain an elastomer material.

11. The valve of claim 1, wherein the second control element comprises a second closing member in the form of a valve disk at an end of the second control element facing a delivery chamber inside the outflow portion, wherein in a closed position of the second control element, the valve disk is pressed against a seat by a second spring element.

12. The valve of claim 11, wherein a spring characteristic of the first spring element in the inflow portion is greater than a spring characteristic of the second spring element in the outflow portion.

13. The valve of claim 1, wherein the cylindrical body of the second control element is guided in an axial movement by at least one guide web arranged on an inside wall of the outflow portion.

14. The valve of claim 13, wherein the flange of the cylindrical body of the second control element is supported on the inside wall of the outflow portion to axially guide the second control element.

15. A fuel injection system for injecting fuel in an internal combustion engine, the fuel injection system comprising:
   a fuel rail, and
   a plurality of fuel injection valves coupled to the fuel rail, each fuel injection valve comprising:
   a housing including an inflow portion and an outflow portion for the gaseous fuel, and a drive portion located between the inflow portion and the outflow portion,
   a first control element assigned to the inflow portion and configured to enable or prevent the delivery of the gaseous fuel depending on a switching position of the first control element, the first control element comprising an armature plate with an end face facing an actuating drive;
   a second control element assigned to the outflow portion and configured to enable or prevent the delivery of the gaseous fuel depending on a switching position of the second control element, the second control element comprising a flange at a first end of the second control element; and
   the actuating drive arranged in the drive portion and configured to open the first and second control elements independently of one another;
   wherein the flange of the second control element extends into a cylindrical chamber in the end face of the armature plate with an air gap between a base of the cylindrical chamber and an end face of the flange in a closed position of the valve.

16. A valve for injecting gaseous fuels for an internal combustion engine, the valve comprising:
   a housing including an inflow portion and an outflow portion for the gaseous fuel, and a drive portion located between the inflow portion and the outflow portion,
   a first control element having an armature plate formed on a first end of the first control element, and assigned to the inflow portion and configured to enable or prevent the delivery of the gaseous fuel depending on a switching position of the first control element,
   a second control element comprising a cylindrical body, and assigned to the outflow portion and configured to enable or prevent the delivery of the gaseous fuel depending on a switching position of the second control element, and
   an actuating drive comprising a solenoid coil arranged in a chamber of the drive portion and having a central opening, and configured to open the first and second control elements independently of one another;
   wherein a portion of the cylindrical body of the second control element is guided through the central opening of the solenoid coil;
   the second control element comprises a flange projecting into a chamber of the armature plate, such that in a closed position of the second control element, an end face of the flange remains spaced apart from the base of the chamber, and a second fuel duct in the cylindrical body of the second control element;
   wherein the second fuel duct extends axially from the end face of the flange to a location proximate the closing member, and communicates with a radially running bore leading to an outside of the cylindrical body to define a flow connection to the delivery chamber.

* * * * *